United States Patent [19]
Sas-Jaworsky

[11] Patent Number: 5,988,702
[45] Date of Patent: Nov. 23, 1999

[54] COMPOSITE COILED TUBING END CONNECTOR

[75] Inventor: Alexander Sas-Jaworsky, Houston, Tex.

[73] Assignee: Fiber Spar and Tube Corporation, West Wareman, Mass.

[21] Appl. No.: 08/721,135

[22] Filed: Sep. 26, 1996

Related U.S. Application Data

[60] Provisional application No. 60/005,377, Sep. 28, 1995.

[51] Int. Cl.$^6$ ....................................................... F16L 33/18
[52] U.S. Cl. ........................ 285/249; 281/259; 281/222.1
[58] Field of Search .................................. 285/249, 247, 285/248, 222.1, 245, 259

[56] References Cited

U.S. PATENT DOCUMENTS

| | | | |
|---|---|---|---|
| 418,906 | 1/1890 | Bosworth | 285/249 |
| 2,481,001 | 9/1949 | Burckle | 285/259 |
| 2,991,093 | 7/1961 | Guarnaschelli | 285/249 |
| 3,306,637 | 2/1967 | Press et al. | 285/249 |
| 3,589,752 | 6/1971 | Spencer | 285/259 |
| 3,685,860 | 8/1972 | Schmidt | 285/249 |
| 3,856,052 | 12/1974 | Feucht | 138/119 |
| 3,907,335 | 9/1975 | Burge et al. | 285/249 |
| 4,032,177 | 6/1977 | Anderson | 285/24 |
| 4,111,469 | 9/1978 | Kavick | 285/259 |
| 4,226,446 | 10/1980 | Burrington | 285/259 |
| 4,303,263 | 12/1981 | Legris | 285/249 |
| 4,530,379 | 7/1985 | Pliocelli | 138/109 |
| 4,712,813 | 12/1987 | Passerell et al. | 285/250 |
| 4,844,516 | 7/1989 | Baker | 285/351 |
| 4,936,618 | 6/1990 | Sampa et al. | 294/86.31 |
| 5,090,741 | 2/1992 | Yokomatsu et al. | 285/249 |
| 5,156,206 | 10/1992 | Cox | 166/242 |
| 5,184,682 | 2/1993 | Delacour et al. | 166/385 |
| 5,332,269 | 7/1994 | Homm | 285/249 |
| 5,348,088 | 9/1994 | Laflin et al. | 166/134 |
| 5,351,752 | 10/1994 | Wood et al. | 166/68 |
| 5,452,923 | 9/1995 | Smith | 285/145 |
| 5,558,375 | 9/1996 | Newman | 285/249 |

FOREIGN PATENT DOCUMENTS

| | | |
|---|---|---|
| 0 203 887 A2 | 12/1986 | European Pat. Off. . |
| 0 427 306 A2 | 5/1991 | European Pat. Off. . |
| 503737 | 9/1992 | European Pat. Off. ............... 285/249 |
| 0 536 844 A1 | 4/1993 | European Pat. Off. . |
| 989204 | 9/1951 | France . |
| 163592 | 6/1990 | Japan .................................... 285/249 |
| 809097 | 2/1959 | United Kingdom ................... 285/249 |
| 956500 | 4/1964 | United Kingdom ................... 285/249 |
| 1297250 | 11/1972 | United Kingdom . |
| 2 103 744 | 1/1983 | United Kingdom . |

Primary Examiner—Eric K. Nicholson
Attorney, Agent, or Firm—Lahive & Cockfield, LLP

[57] ABSTRACT

A connector is disclosed for use with composite spoolable pipe such as for use in well logging and workover operations in oil wells. The pipe which is spoolable is comprised of an outer composite structure containing several plies of high strength and stiffness fibers embedded in a resin material such as epoxy. The fibers are oriented to resist internal and external pressure and provide low bending stiffness. Fibers of high strength and modulus are embedded and bonded into a matrix that keeps the fibers in position, acts as a load transfer medium and protects the fibers from environmental damage. The plastic binder in which the fibers are embedded to form the matrix will have a modulus of elasticity (hereinafter modulus) that exceeds 100,000 psi. Typically, a liner may be employed in the pipe to serve as a structural member, one function of which is pressure containment to resist leakage of internal fluids within the tubing. A wear surface is employed as an outer layer and may be comprised of a binder containing particles of a tough material.

13 Claims, 3 Drawing Sheets

COMPOSITE COILED TUBING END CONNECTOR

RELATED APPLICATIONS

The current application claims priority from the United States Provisional Application, Ser. No. 60/005,377, filed Sep. 28, 1995 and having the same title.

FIELD OF THE INVENTION

This application relates generally to a connector for use with a spoolable pipe constructed of composite material and more particularly to a field serviceable connector for use in such applications.

BACKGROUND OF THE INVENTION

A spoolable pipe in common use is steel coiled tubing which finds a number of uses in oil well operations. For example, it is used in running wireline cable down hole with well tools, such as logging tools and perforating tools. Such tubing is also used in the workover of wells, to deliver various chemicals downhole and perform other functions. Coiled tubing offers a much faster and less expensive way to run pipe into a wellbore in that it eliminates the time consuming task of joining typical 30 foot pipe sections by threaded connections to make up a pipe string that typically will be up to 10,000 feet or longer.

Steel coiled tubing is capable of being spooled because the steel used in the product exhibits high ductility (i.e. the ability to plastically deform without failure). The spooling operation is commonly conducted while the tube is under high internal pressure which introduces combined load effects. Unfortunately, repeated spooling and use causes fatigue damage and the steel coiled tubing can suddenly fracture and fail. The hazards of the operation and the risk to personnel and the high economic cost of failure in down time to conduct fishing operations forces the product to be retired before any expected failure after a relatively few number of trips into a well. The cross section of steel tubing expands during repeated use resulting in reduced wall thickness and higher bending strains with associated reduction in the pressure carrying capability. Steel coiled tubing presently in service is generally limited to internal pressures of about 5000 psi. Higher internal pressure significantly reduces the integrity of coiled tubing so that it will not sustain continuous flexing and thus severely limits its service life.

It is therefore desirable to provide a substantially non-ferrous spoolable pipe capable of being deployed and spooled under borehole conditions and which does not suffer from the structural limitations of steel tubing and which is also highly resistant to chemicals. Such non-ferrous spoolable pipe often carries fluids which may be transported from the surface to a downhole location as in the use of coiled tubing to provide means for treating formations or for operating a mud motor to drill through the formations. In addition, it may be desirable to pump devices through the spoolable pipe such as through a coiled tubing bore to a downhole location for various operations. Therefore, an open bore within the spoolable pipe is essential for some operations.

In the case of coiled tubing, external pressures can also be a major load condition and can be in excess of 2500 psi. Internal pressure may range from 5,000 psi to 10,000 psi in order to perform certain well operations; for example, chemical treatment or fracturing.

Tension and compression forces on coiled tubing are severe in that the tubing may be forced into or pulled from a borehole against frictional forces in excess of 20,000 lbf.

For the most part prior art non-metallic tubular structures that are designed for being spooled and also for transporting fluids, are made as a hose whether or not they are called a hose. An example of such a hose is the Feucht structure in U.S. Pat. No. 3,856,052 which has longitudinal reinforcement in the side walls to permit a flexible hose to collapse preferentially in one plane. However, the structure is a classic hose with vulcanized polyester cord plies which are not capable of carrying compression loads or high external pressure loads. Hoses typically use an elastomer such as rubber to hold fiber together but do not use a high modulus plastic binder such as epoxy. Hoses are designed to bend and carry internal pressure but are not normally subjected to external pressure or high axial compression or tension loads. For an elastomeric type material such as used in hoses the elongation at break is so high (typically greater than 400 percent) and the stress-strain response so highly nonlinear; it is common practice to define a modulus corresponding to a specified elongation. The modulus for an elastomeric material corresponding to 200 percent elongation typically ranges from 300 psi to 2000 psi. The modulus of elasticity for typical plastic matrix material used in a composite tube is from 100,000 psi to 500,000 psi or greater, with representative strains to failure of from 2 percent to 10 percent. This large difference in modulus and strain to failure between rubber and plastics and thus between hoses and composite tubes is what permits a hose to be easily collapsed to an essentially flat condition under relatively low external pressure and eliminates the capability to carry high axial tension or compression loads while the higher modulus characteristic of the plastic matrix material used in a composite tube is sufficiently stiff to transfer loads into the fibers and thus resist high external pressure and axial tension and compression without collapse. The procedure to construct a composite tube to resist high external pressure and compressive loads involves using complex composite mechanics engineering principles to ensure that the tube has sufficient strength. It has not been previously considered feasible to build a truly composite tube capable of being bent to a relatively small diameter, and be capable of carrying internal pressure and high tension and compression loads in combination with high external pressure requirements. Specifically a hose will not sustain high compression and external pressure loads.

In operations involving spoolable pipe, it is often necessary to make various connections such as to interconnect long sections or to connect tools or other devices into or at the end of the pipe string. With steel coiled tubing, a variety of well known connecting techniques are available to handle the severe loads encountered in such operations. Threaded connections as well as welded connections are easily applied and meet the load requirements described.

Grapple and slip type connectors have also been developed for steel coiled tubing to provide a low profile and also be field serviceable. These steel tubing connectors are not applicable to the composite coiled tubing that is now being developed. One such connector is shown in U.S. Pat. No. 4,936,618 to Sampa et al showing a pair of wedge rings for making a gripping contact with the coiled tubing.

The PETRO-TECH Tools Incorporated catalog shows coiled tubing E-Z Connectors, Product Nos. 9209 to 9211 that are also examples of a slip type steel coiled tubing connector.

Another connector for reeled thin-walled tubing is shown in U.S. Pat. No. 5,156,206 to Cox and utilizes locking slips for engaging the tubing in an arrangement similar to the Petro-Tech connector.

U.S. Pat. No. 5,184,682 to Delacour et al shows a connector having a compression ring for engaging a rod for use in well operations, again using a technique similar to a Petro-Tech connector to seal against the rod.

These commercial coiled tubing connectors will not seal properly as configured to a composite pipe partially because of circumferential deformation of the pipe inwardly when the connector is made up on composite pipe and also because the external surface of a composite tube or pipe is not as regular in OD tolerance which causes sealing problems.

U.S. Pat. No. 4,530,379 to Policelli teaches a composite fiber tubing with a structural transition from the fiber to a metallic connector. The fibers may be graphite, carbon, aramid or glass. The FIG. 4 embodiment can be employed in a fluid conveyance pipe having bending loads in addition to internal pressure loads and in structural members having bending and axial stiffness requirements.

There are many connectors designed for application to elastomeric hoses and tubes such as shown in U.S. Pat. No. 3,685,860 to Schmidt, U.S. Pat. No. 3,907,335 to Burge et al, but sealing to these hoses is substantially different in that the hose body itself serves as a sealing material when pressed against connecting members. A composite pipe is too rigid to function in this way. U.S. Pat. No. 4,032,177 to Anderson shows an end fitting for a non-metallic tube such as a plastic tube and having a compression sleeve and a tubing reinforcing insert but here again the tube itself is deformable to the extent of effecting a seal when compressed by the coupling.

Another coupling for non-metallic natural gas pipe is shown in U.S. Pat. No. 4,712,813 to Passerell et al and shows a gripping collet for engaging the outer tubular surface of the pipe and a sealing arrangement for holding internal gas pressure within the pipe but no inner seals are on the pipe and seals cannot be changed without disturbing the gripping mechanism.

U.S. Pat. No. 5,351,752 to Wood et al shows a bonded connector for coupling composite tubing sections for pumping a well. The composite tubing has threaded fittings made of composite materials which are bonded to the tubing.

SUMMARY OF THE INVENTION

In accordance with the invention, a connector is provided for use with composite spoolable pipe such as for use in well logging and workover operations in oil wells. The pipe which is spoolable is comprised of an outer composite structure containing several plies of high strength and stiffness fibers embedded in a resin material such as epoxy. The fibers are oriented to resist internal and external pressure and provide low bending stiffness. Fibers of high strength and modulus are embedded and bonded into a matrix that keeps the fibers in position, acts as a load transfer medium and protects the fibers from environmental damage. The plastic binder in which the fibers are embedded to form the matrix will have a modulus of elasticity (hereinafter modulus) that exceeds 100,000 psi. Typically, a liner may be employed in the pipe to serve as a structural member, one function of which is pressure containment to resist leakage of internal fluids within the tubing. A wear surface is employed as an outer layer and may be comprised of a binder containing particles of a tough material.

The connector of the present invention provides a means for its being secured to an end of such a composite tube or pipe in any one of numerous termination applications including, end connectors, joint splices, service or tool connectors, to name a few. The connector is arranged to be field serviceable and also to maintain the full design ratings of the pipe string and components being connected (such as in tension, compression and pressure). The composite pipe body is generally rigid and therefore the structural integrity and geometry of the pipe must be preserved as the connector is assembled, run and placed in service on the composite spoolable pipe. The connector utilizes a base connector housing which is arranged about the end of a composite tube. A load flank collar also encompassing the pipe is arranged to be threaded into the inner end of the housing and when threadedly pulled toward one another, these sections act against a load ferrule system to compress teeth on the ferrule into the outer surface of the composite pipe. These teeth must be sized and shaped to provide a unitary structure with the composite materials when the teeth are compressed into the composite pipe. In this respect, the load ferrule is provided with pointed teeth that are capable of penetrating the wear surface and at least one outer ply of the composite tube and thereby access a transfer load capability that encompasses the resin matrix and at least one layer of fiber. A ferrule load support mandrel positioned in the inner bore of the composite pipe establishes hoop strength within the composite pipe and thereby provides a backup to the load ferrule to insure that its teeth are properly embedded into the plies of composite materials. The ferrule teeth are arranged so that they penetrate beyond the outermost surface and into the composite body to an extent that permits transfer of load into the composite body.

A seating ring and end seal at the end of the composite pipe, as well as seals on the internal bore of the composite pipe provide for pressure sealing integrity between the composite pipe and a seal carrier component. The seal carrier can be readily removed from the connector assembly in order to replace seals. Removal of the seal carrier does not disturb the integrity of the load transfer mechanism of the connector assembly. The seating ring and end seal protects the exposed end of the composite tube from fluids within the pipe which may be detrimental to the composite materials.

DETAILED DESCRIPTION OF THE INVENTION

Figure 1:
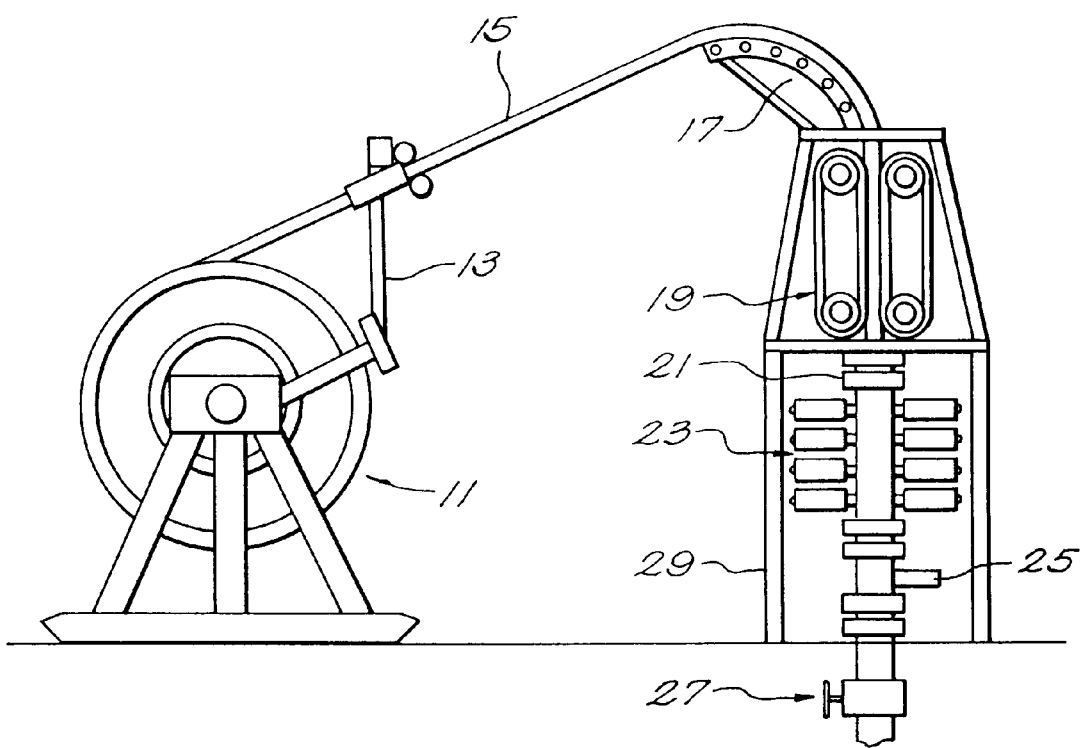
FIG. 1 is a schematic view of a coiled tubing injector mounted on a wellhead.

While this invention is directed generally to providing connectors for composite spoolable pipe, the disclosure is directed to a specific application involving coiled tubing service and in particular downhole uses of coiled tubing.

Composite coiled tubing offers the potential to exceed the performance limitations of isotropic metals, thereby increasing the service life of the pipe and extending operational parameters. Composite coiled tubing is constructed as a continuous tube fabricated generally from non-metallic materials to provide high body strength and wear resistance. This tubing can be tailored to exhibit unique characteristics which optimally address burst and collapse pressures, pull and compression loads, as well as high strains imposed by bending. This enabling capability expands the performance parameters beyond the physical limitations of steel or alternative isotropic material tubulars. In addition, the fibers and resins used in composite coiled tubing construction make the tube impervious to corrosion and resistant to chemicals used in treatment of oil and gas wells.

The service life potential of composite coiled tubing is substantially longer than that of conventional steel pipe when subjected to multiple plastic deformation bending cycles with high internal pressures. Composite coiled tubing will provide the ability to extend the vertical and horizontal reach of existing concentric well services. The operational concept of a coiled tubing system involves the deployment of a continuous string of small diameter tubing into a wellbore to perform specific well service procedures without disturbing the existing completion tubulars and equipment. When the service is completed, the small diameter tubing is retrieved from the wellbore and spooled onto a large reel for transport to and from work locations. Additional applications of coiled tubing technology include drilling wells and servicing other extended reach applications such as remedial work in pipelines.

The primary equipment components which most affect the performance of the tubing string include the injector, tubing guide arch, and the service reel. The tubing is deployed into or pulled out of the well with the injector. The most common design of injector utilizes two opposed sprocket drive traction chains which are powered by hydraulic motors. These chains include interlocking gripper blocks mounted between the chain links to fit the circumference of the coiled tubing outside diameter in service. The gripper blocks are forced onto the pipe by a series of hydraulically actuated compression rollers that impart the gripping force required to create and maintain the friction drive system. A tubing guide arch is mounted directly above the injector and is constructed as a 90° arched roller system to receive the tubing from the reel and it into the chain blocks. The coiled tubing is bent over the tubing guide arch by applied tension from the reel to ensure that the tubing remains on the rollers. The coiled tubing reel is a fabricated steel spool with a core diameter ranging from 48 to 130 inches (depending upon the size of coiled tubing) and is equipped with a rotating high pressure swivel which allows for continuous fluid pumping services to be performed even when the pipe is in motion.

The coiled tubing industry has rapidly grown to provide almost any service which is currently performed with jointed tubing. An estimated 600 coiled tubing units are currently operating worldwide. Although coiled tubing services have gained a reputation for safe and reliable service, an inevitable consequence of performing continuous string concentric workover services is the repeated cycling of the tubing into and out of plastic deformation resulting in the rapid reduction in service life. Steel coiled tubing strings used in coiled tubing service undergo bending cycles during deployment and retrieval over radii significantly less than the minimum bending radii needed for the material to remain in the elastic state. The repeated cycling of coiled tubing into and out of plastic deformation induces irreparable damage to the steel tube body. When coiled tubing is subjected to the aforementioned bending events with internal pressures below the rated yield pressure for the bending radii commonly used, the tubing accumulates damage and ultimately fails in a condition commonly described as ultra-low cycle fatigue. Coiled tubing services performed with internal pressures result in significant plastic deformation of the pipe, commonly referred to as diametrial growth or "ballooning". When the tubing experiences ballooning, the average wall thickness of the tube is reduced. Bending imposes tensile and compressive stresses on the pipe, therefore the stress field is not uniform around the circumference of the tube. As a result, the tube walls thin unevenly about the circumference of the tube. The reduced pressure capability of a coiled tubing service string resulting from pipe wall thinning is further complicated by metal loss due to corrosion.

An additional limitation of steel coiled tubing strings is the practical maximum working depths in highly deviated and horizontal boreholes due to the effect of weight and drag on the pipe.

In order to overcome the disadvantages of the present steel coiled tubing as discussed above, fibrous composite materials are now being tailored to exhibit unique anisotropic characteristics to optimally address the burst and collapse pressures as well as tensile and compression loads in the construction of composite coiled tubing.

High performance composite structures are generally constructed as a buildup of laminant layers with the fibers in each layer oriented in a particular direction or directions. These fibers are normally locked into a preferred orientation by a surrounding matrix material. The matrix material, normally much weaker than the fibers, serves the critical role of transferring load into the fibers. Fibers having a high potential for application in constructing composite pipe include glass, carbon, and aramid. Epoxy or thermoplastic resins are good candidates for the matrix material.

The connector of the present invention can have application to any number of composite tube designs but is arranged to be applied to a pipe that has an outer surface made from a composite material that can receive gripping elements which can penetrate into the composite material without destroying the structural integrity of the outer surface. This outer surface will also be required to act as a wear surface as the pipe engages the surface equipment utilized in handling such pipe. While spoolable composite pipe for use with the connector of the present invention may have many uses, this disclosure focuses on a coiled tubing for use in wellbores. FIG. 1 shows a typical set up for surface handling equipment used in coiled tubing operations. A hydraulically operated spooling device 11 has a levelwind mechanism 13 for guiding coiled tubing on and off the reel. The tubing 15 passes over a tubing guide arch 17 which provides a bending radius for moving the tubing into a vertical orientation for injection through wellhead devices into the wellbore. The tubing passes from the tubing guide arch 17 into powered injector 19 which grippingly engages the tubing and pushes it into the well. A stripper assembly 21 under the injector maintains a dynamic and static seal around the tubing to hold well pressure within the well as the tubing passes into the wellhead devices which are under well pressure. The tubing then moves through a well control stack 23, a flow tee 25, and wellhead master valve or tree valve 27 as it passes into the wellpipe. An injector support 29 has legs that are adjustable to stabilize the injector over the well control stack positioned below it. A quick connect fitting is placed between the well control stack and the stripper above. When making up the coiled tubing tool string for running into a well, the following procedure is followed: First, the wellhead tree valve is closed to seal off the well and the well control stack is opened. Then, the service end of the coiled tubing is run over the guide 17 and through the injector 19 and stripper 21 (injector assembly). A length is run through this injector assembly where the connector and tools are assembled onto the tubing 15. When a side door or radial stripper is used, such as manufactured by Texas Oil Tools, the constraining bushings may be removed from the stripper and the connector can be mounted on the tubing 15 prior to running it through the injector assembly. The constraining bushings are then reinserted.

After the tools are connected, the injector assembly is raised with the tools extending from the bottom and lowered into the top of the well control stack. This provides about 8 feet of space to receive the tool string and end connector. A lubricator can be used to extend this distance. The stripper 21 is reinstalled on the BOP stack and the quick union on the bottom of the stripper and top of the well control stack is made up. A pressure test is conducted with the wellhead tree closed and the coiled tubing open into the flow tee at the bottom of the well control stack. This procedure pressure tests the coiled tubing, surface treatment lines, wellhead connectors and flow control devices. Next, the pressure on the coiled tubing system and control stacks is matched to the well pressure and the well is opened up. The coiled tubing string is then run into the well.

When the connector of the present invention is attached to the coiled tubing, the wellhead equipment just described is sometimes arranged so that it will not permit passage of the connector through portions of the equipment. When pulling a coiled tubing string with a connector from the well, the sequence is as follows: the tool string is pulled up into the well control stack with pressure on the coiled tubing string. The wellhead (tree valve) is then closed below the well control stack. The pressure above the well valve is then bled off and the quick connector between the well control stack and the stripper is opened. The hoisting device lifts the injector to pull the end connector and tools up out of the stack. Whereupon the tools are removed and the connector is cut off of the tubing before the tubing is pulled through the stripper 21. The tubing 15 is then further retrieved (wound) onto the spool 11. The connector may then be reused in another operation.

Figure 2:
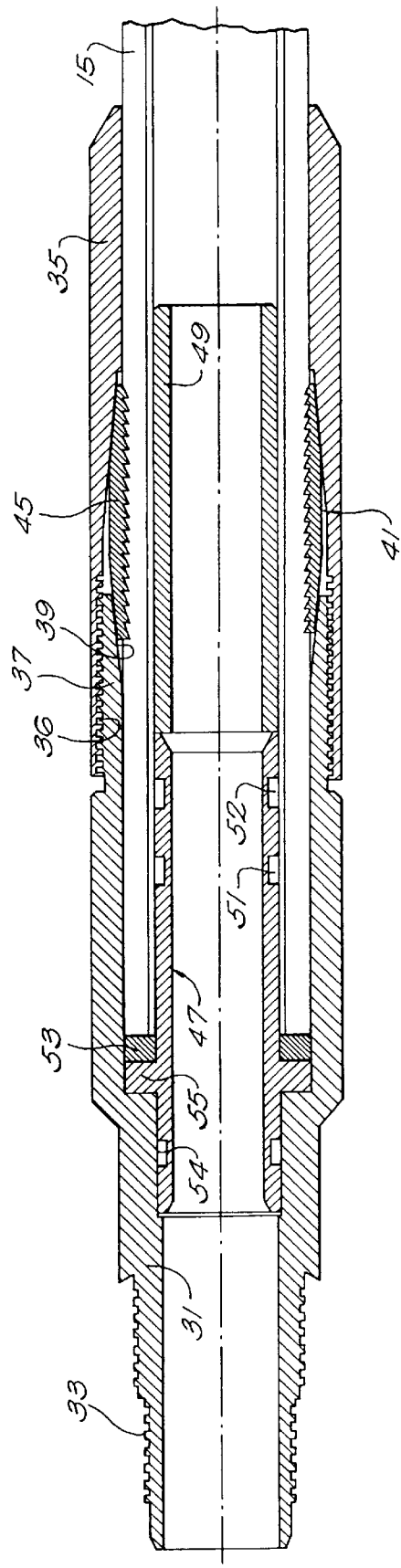
FIG. 2 is a cross-sectional, elevational view of an end connector assembly for use with a composite tube and embodying principals of the present invention.

Referring next to FIG. 2, an end connector assembly is shown having a housing 31 having a threaded end portion 33 for connection to other devices or components in a bottom hole assembly, or to connect to other lengths of spoolable pipe. A load collar 35 has an internally threaded end portion 36 for engagement with external threads on a trailing end 37 of the housing 31. A bevel 39 is formed in the bore of the trailing end 37 to form a reverse load flank. A beveled surface 41 is also formed in the bore of the load collar 35. The beveled surfaces 39, 41 together form a cavity when the collar 35 and housing 31 are threadedly engaged as shown in FIG. 2. This cavity is shaped to receive and matingly engage the oppositely beveled outer surfaces formed on a splined tooth load ferrule 45. Other components of the connector assembly comprise a seal carrier 47 and a ferrule load support 49 that is arranged, in assembly, within the bore of the composite pipe 15.

When assembled, the bore of collar 35 is slid up over the outer surface of the pipe 15 well back from the service end of the pipe. The ferrule load support 49 is then positioned in the bore of pipe 15 at a spaced distance from the end of the pipe which is calculated to be opposite the cavity in the connector assembly receiving the ferrule 45. Next the ferrule 45 is positioned about the outer surface of the composite pipe opposite the position of the load support 49. The seal carrier 47 together with seals 51, 52 on the outer surface of the carrier and seat ring 53 positioned against shoulder 55, are assembled into and against the end of the composite coiled tubing. The seat ring may be constructed of a material such as Nitrile, Viton or Teflon. The seat ring can be constructed of a material having a hardness of 80° to 100° durometer. The seals 51 and 52 seal off the space between the outer surface of the carrier 47 and the bore of the tubing 15. Sealing between the bore of composite pipe 15 and the connector provides the advantage of sealing to a more accurately dimensioned and regular surface, to thereby enhance sealing performance. The seat ring 53 seals off and protects the end of the tubing 15. In addition all these seals are removable and replaceable by removing the carrier from the end of the tubing 15. This can be done without disturbing the load transfer mechanism of the connector, i.e. the ferrule system.

The connector housing 31 is then inserted over the end of the tubing 15 and an outer end portion 56 of carrier 47 projecting out of the end of tubing 15. A rubber seal 54 is positioned on this projecting end portion 56 to seal between the carrier 47 and the bore of housing 31. When the carrier 47 is inserted into the bore of tubing 15, its length is sized to engage the ferrule load support 49 and move it into the proper position within the tubing to be opposite the ferrule 45. The last step in the assembly is to move the load collar 35 forward on the tubing until it can be threadedly made up onto the threaded trailing end 37 of the connector housing. As this threaded connection is made up, the tapered surface 39 on the trailing end 37 and a similar beveled undercut 41 on the bore of load collar 35 engage respective surfaces 57, 58 of a double tapered outer surface of the ferrule 45. This engaging action of surfaces 57, 58 on the ferrule with the beveled surfaces 39 and 41 serves to compress the ferrule teeth into the outer surface of the tubing 15.

Figure 3:
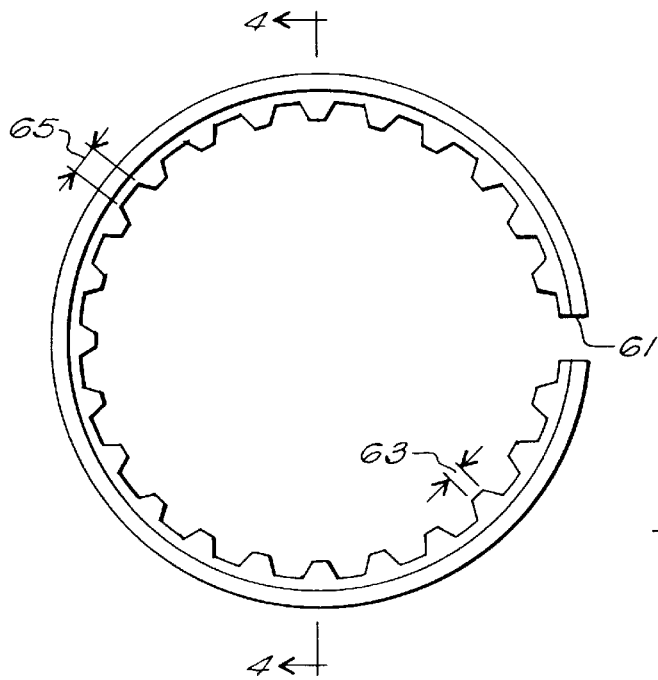
FIG. 3 shows a cross-sectional perspective, view of an embodiment of a toothed ferrule used in the connector of FIG. 1 for engaging the connector body to the composite tube.
Figure 4:
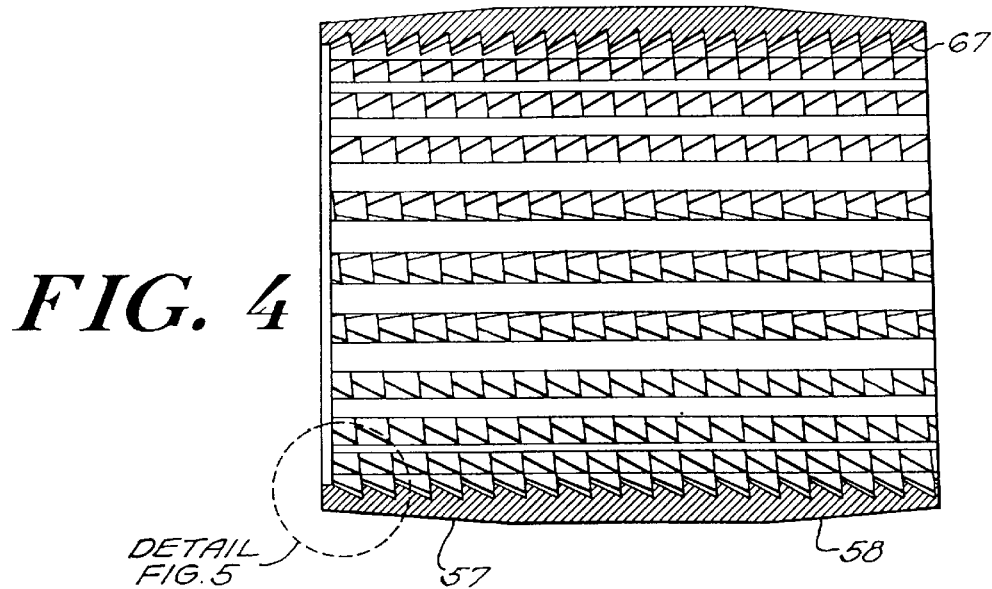
FIG. 4 shows a partial end view of another embodiment of the load ferrule, showing the configuration of teeth for engaging the composite material in a tubular member receiving the connector.
Figure 5:
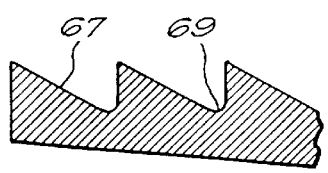
FIG. 5 is a detailed, elevational view of the ferrule teeth shown in FIG. 3.

FIG. 4 shows the ferrule 45 in detail having the longitudinally oppositely tapered surfaces 57, 58 on its outer surface. A longitudinal slot 61 in FIG. 3 provides a means for collapsing or compressing the ferrule about the pipe 15 and thereby embed the ferrule teeth into the outer layer(s) of the composite pipe. The teeth have a laterally flat top edge 63 and a laterally flat spacing 65 between longitudinal rows of teeth. A sloping surface 67 of the teeth tapers from an outward edge 63 to a flat valley 69 between lateral or circumferential rows of teeth. The teeth can be arranged in substantially longitudinal rows that are radially spaced 10° to 20° from one another, and the rows of teeth can be separated by a flat bottomed furrow each having a width of at least 0.090 inches. The distance between parallel circumferential rows can be from about 0.080 to 0.120 inches. These teeth, as contrasted to spiral threads used on steel tube applications are arranged to fully embed into the outer surface so that the valley surface 69 on the toothed ferrule is in contact with the material in the outer layers and the entire tooth surface area is engaged with material in the composite pipe layers. It is preferable that the teeth penetrate into the second laminate of fibers and encompassing resin in the composite tube to provide the shear strength needed to ensure adequate tensile load strength in the 20 kpsi range. The top flat edge 63 is likewise arranged to provide a firm and extensive lateral surface on the teeth to give tensile strength to the load transfer system.

The longitudinal flat spiral furrow 65, between rows of teeth, serves to provide a frictional engaging surface between the ferrule and the pipe's outer surface to further enhance the load transfer factor between the connector and the pipe. The width of this furrow surface 65 may be in the range of 0.110 to 0.120 inches for a ferrule used with 1½ ninches OD composite pipe. This represents a total furrow 65 cross-sectional surface that is greater than 50% of the circumference measurement on the inner toothed surface of the ferrule.

The service to which a coiled tubing string is subjected provides a rather severe physical environment. Internal pressures may be in the order of 7,000 to 10,000 psi; while tensile loads can be as much as 20,000 to 25,000 psi. With this in mind it is readily seen that load transfer between a connector and the composite pipe is of critical importance and features such as those described in the present application, as for example in the shape and spacing of teeth on the ferrule, become extremely important to the overall success of this new product.

While particular embodiments of the present invention have been shown and described, it is apparent that changes and modifications may be made without departing from this invention in its broader aspects, and therefore, the aim in the appended claims is to cover all such changes and modifications as fall within the true spirit and scope of this invention.

We claim:

1. A field serviceable connector for attaching a spoolable composite pipe to a service member, wherein the pipe is constructed of multiple plies of fibers embedded in a resin matrix, the connector comprising;
    a connector housing having a first threaded surface for connecting the composite pipe with the service member, a second threaded surface for assembling said housing onto the composite pipe, and a housing bore for receiving an end of the pipe;
    a seal carrier received within said housing bore and within a bore in said composite pipe when the connector is assembled on said pipe, said seal carrier having means for carrying annular seals thereon to seal between said housing bore and said seal carrier and between said seal carrier and the bore in said pipe;
    a load transfer collar carried about the outer surface of said composite pipe for threadedly engaging the second threaded surface on said housing to thereby transfer loads on said composite pipe into said housing;
    a load transmitting ferrule positioned about the outer surface of the composite pipe and engaged by said connector housing and by said load transfer collar for moving and holding said ferrule into gripping contact with said composite pipe, said load transmitting ferrule having teeth formed on its inner surface which are arranged for penetrating into at least one of the plies of fibers of the composite pipe when the connector is made up on the composite pipe; and
    a load support arranged for being positioned in the bore of the composite pipe at a position opposite said load transmitting ferrule positioned on the outer surface of the composite pipe for resisting deformation of the composite pipe when said ferrule is engaged by said connector housing and by said load transfer collar and moved into gripping contact on the composite pipe.

2. A field serviceable connector for attaching a spoolable composite pipe to a service member, wherein the pipe is constructed of multiple plies of fibers embedded in a resin matrix, the connector comprising;
    a connector housing having a first threaded surface for connecting the composite pipe with the service member, a second threaded surface for assembling said housing onto the composite pipe, and a housing bore for receiving an end of the pipe;
    a seal carrier received within said housing bore and within a bore in said composite pipe when the connector is assembled on said pipe, said seal carrier having means for carrying annular seals thereon to seal between said housing bore and said seal carrier and between said seal carrier and the bore in said pipe;
    a load transfer collar carried about the outer surface of said composite pipe for threadedly engaging the second threaded surface on said housing to thereby transfer loads on said composite pipe into said housing;
    a load transmitting ferrule positioned about the outer surface of the composite pipe and engaged by said connector housing and by said load transfer collar for moving and holding said ferrule into gripping contact with said composite pipe;
    a seating ring constructed of a material having a hardness of 80 to 100 durometer, said seating ring protecting the exposed composite pipe end from exposure to materials carried in the pipe bore; and
    a load support arranged for being positioned in the bore of the composite pipe at a position opposite said load transmitting ferrule positioned on the outer surface of the composite pipe for resisting deformation of the composite pipe when said ferrule is engaged by said connector housing and by said load transfer collar and moved into gripping contact on the composite pipe.

3. The connector of claim 1 and further including recess means formed on the bore of said housing opposite said second threaded surface, said recess means arranged to matingly receive said load transmitting ferrule and to engage and move said load transmitting ferrule into gripping contact with the composite pipe when said collar is threadedly engaged with said housing.

4. The connector of claim 1 and further including recess means formed on a bore within said collar, said recess means arranged to matingly receive said load transmitting ferrule and to engage and move said ferrule into gripping contact with the composite pipe when said collar is threadedly engaged with said housing.

5. The connector of claims 3 or 4 and further including a beveled surface on said recess means and beveled surface means on said load transmitting ferrule which is arranged to matingly engage the beveled surface on said recess means when said housing and collar are threadedly engaged to move said ferrule into gripping contact with the composite pipe.

6. The connector of claim 1 and further including a longitudinal slot in said load transmitting ferrule to permit radial collapse of said ferrule teeth into penetrating contact with at least one of the plies of fibers of the composite pipe.

7. A field serviceable connector for attaching a spoolable composite pipe to a service member, wherein the pipe is constructed of multiple plies of fibers embedded in a resin matrix, the connector comprising;
    a connector housing having a first threaded surface for connecting the composite pipe with the service member, a second threaded surface for assembling said housing onto the composite pipe, and a housing bore for receiving an end of the pipe;
    a seal carrier received within said housing bore and within a bore in said composite pipe when the connector is assembled on said pipe, said seal carrier having means for carrying annular seals thereon to seal between said housing bore and said seal carrier and between said seal carrier and the bore in said pipe;

a load transfer collar carried about the outer surface of said composite pipe for threadedly engaging the second threaded surface on said housing to thereby transfer loads on said composite pipe into said housing;

a load transmitting ferrule positioned about the outer surface of the composite pipe and engaged by said connector housing and by said load transfer collar for moving and holding said ferrule into gripping contact with said composite pipe, said load transmitting ferrule having teeth formed on its inner surface which are arranged for penetrating into at least one of the plies of fibers of the composite pipe when the connector is made up on the composite pipe, said teeth being of sufficient radial length to at least extend into the first fiber laminate of the pipe body, and said teeth being arranged in circumferential and longitudinal rows and having a substantially perpendicular front load flank to provide a maximum axial load surface when engaged with the composite pipe; and a load support arranged for being positioned in the bore of the composite pipe at a position opposite said load transmitting ferrule positioned on the outer surface of the composite pipe for resisting deformation of the composite pipe when said ferrule is engaged by said connector housing and by said load transfer collar and moved into gripping contact on the composite pipe.

8. The connector of claim 7 wherein said circumferential rows of teeth are spiraled about the inner surface of said ferrule so that said longitudinal rows are angularly disposed with respect to the longitudinal axis of said pipe.

9. The connector of claim 1 wherein said teeth are arranged in substantially longitudinal rows that are radially spaced 10° to 20° from one another and the rows of teeth are separated by a flat bottomed furrow each having a width of at least 0.090 inches.

10. A field of serviceable connector for attaching a spoolable composite pipe to a service member, wherein the pipe is constructed of multiple plies of fibers embedded in a resin matrix, the connector comprising;

a connector housing having a first threaded surface for connecting the composite pipe with the service member, a second threaded surface for assembling said housing onto the composite pipe, and a housing bore for receiving an end of the pipe;

a seal carrier received within said housing bore and within a bore in said composite pipe when the connector is assembled on said pipe, said seal carrier having means for carrying annular seals thereon to seal between said housing bore and said seal carrier and between said seal carrier and the bore in said pipe;

a load transfer collar carried about the outer surface of said composite pipe for threadedly engaging the second threaded surface on said housing to thereby transfer loads on said composite pipe into said housing;

a load transmitting ferrule positioned about the outer surface of the composite pipe and engaged by said connector housing and by said load transfer collar for moving and holding said ferrule into gripping contact with said composite pipe, said load transmitting ferrule having teeth formed on its inner surface which are arranged for penetrating into at least one of the plies of fibers of the composite pipe when the connector is made up on the composite pipe, and a seating ring positioned against an end of said composite pipe to protect the composite pipe end from exposure to materials carried in the composite pipe bore.

11. The connector of claim 10 and further including a load transmitting ferrule positioned about the outer surface of the composite pipe and engaged by said connector housing and by said load transfer collar for moving and holding said ferrule into gripping contact with said composite pipe.

12. The connector of claim 10 and further including a load support arranged for being positioned in the bore of the composite pipe at a position opposite said load transmitting ferrule positioned on the outer surface of the composite pipe for resisting deformation of the composite pipe when said ferrule is engaged by said connector housing and by said load transfer collar and moved into gripping contact on the composite pipe.

13. The field service connector of claim 1, wherein the load transmitting ferrule includes a longitudinal slot to facilitate embedding of the teeth of the ferrule into the composite pipe.

* * * * *